(12) United States Patent
Pedersen et al.

(10) Patent No.: US 7,040,474 B2
(45) Date of Patent: May 9, 2006

(54) BONDED CLUTCH PISTON

(75) Inventors: David Pedersen, Litchfield, NH (US); Todd Michael Gaulin, Rochester, NH (US); Paul T. Hagenow, Goffstown, NH (US)

(73) Assignee: Freudenberg-NOK General Partnership, Plymoutn, MI (US)

( * ) Notice: Subject to any disclaimer, the term of this patent is extended or adjusted under 35 U.S.C. 154(b) by 5 days.

(21) Appl. No.: 10/813,516

(22) Filed: Mar. 30, 2004

(65) Prior Publication Data
US 2005/0217962 A1 Oct. 6, 2005

(51) Int. Cl.
F16D 25/638 (2006.01)

(52) U.S. Cl. .............................. 192/85 AA; 192/106 F

(58) Field of Classification Search ........... 192/85 AA, 192/106 F
See application file for complete search history.

(56) References Cited
U.S. PATENT DOCUMENTS 5,416,966 A * 5/1995 Boerger et al. .......... 29/407.08
5,492,053 A * 2/1996 Stonehill ..................... 92/241
5,558,195 A * 9/1996 Bucciero ............... 192/85 AA
5,899,461 A * 5/1999 Yomogita ................... 277/559
6,039,160 A * 3/2000 Joppeck ..................... 192/52.5
2003/0168306 A1* 9/2003 Gorman et al. ......... 192/85 AA
2004/0004326 A1* 1/2004 Lou ........................... 277/394

* cited by examiner

Primary Examiner—Richard M. Lorence
(74) Attorney, Agent, or Firm—Ronald W. Wangerow; Harness, Dickey & Pierce, P.L.C.

(57) ABSTRACT

A clutch assembly is provided including a first member and a second member rotatable relative to the first member. A clutch pack is provided for frictionally engaging the first and second members. A piston chamber is provided adjacent to the clutch pack, and a piston is disposed in the piston chamber and operable for applying axial pressure to the clutch pack. The piston includes first, second, and third seal portions integrally molded in place on the piston and engaging the piston chamber at spaced locations. The integrally molded first, second, and third seal portions reduce the number of components necessary for properly sealing the piston chamber and reduce the amount of labor required for assembly.

6 Claims, 2 Drawing Sheets

BONDED CLUTCH PISTON

FIELD OF THE INVENTION

The present invention relates to clutch assemblies for automatic transmissions and more particularly, to a sealing arrangement of a piston for use with a clutch assembly.

BACKGROUND OF THE INVENTION

In a typical clutch assembly for an automatic transmission (as illustrated in FIG. 2), a clutch pack 16 is provided for providing a frictional engagement between a first member 12 and a second member 14 which is rotatable relative to the first member 12. A piston 60 is provided within a fluid chamber 62 such that the application of fluid pressure to the fluid chamber 62 causes the piston 60 to move into engagement with the clutch pack 16 to frictionally engage the second member 14 to the first member 12. The contacting of the friction plates with increasing pressure eventually causes the rotation of the second rotatable member 14 which the system is designed to engage.

A problem that has been recognized in the art for a typical clutch assembly of this type is that the centrifugal force of the fluid within the fluid chamber 62 can put a positive pressure on the apply piston 60 as illustrated in FIG. 2. The pressure generated by the centrifugal force of the fluid can cause unintended engagement of the clutch pack 16. Thus, a balance piston system has been developed as illustrated in FIG. 3 in which a balance piston 70 is disposed between the apply piston 60 and the clutch pack 16 so that hydraulic fluid is present on opposite sides of the apply piston 60. When the balance piston system is spinning, the balance piston 70 traps fluid at the outer edge of the cavity 63 that it creates with the apply piston 60 to counteract the centrifugal forces caused by the fluid on the other side of the apply piston 60 as illustrated in FIG. 3. The balance piston 70 is provided with a seal member 72 that contacts an inner surface of the axially extending arm 64 of the apply piston 60. The seal 72 is critical for the proper functioning of the balance piston system. The apply piston 60 includes a first inner diameter seal 74 and second and third outer diameter seals 76, 78, respectively. Each of the seals 74, 76, 78 are loose seals which are received in a respective recessed groove 80a–c formed in the surface of the apply piston 60. In order to form these grooves 80a–c, the apply piston is formed in a casting process in which the grooves 80a–c can be cast or machined. The seals 74 and 76 combine to seal an apply chamber for the apply piston 60 while the seals 76 and 78 each engage an outer diameter surface of the piston chamber 62 along opposite sides of a fluid flow path 82 provided in the outer diameter surface of the apply piston 60. Fluid flow path 82 allows fluid to pass from piston cavity or chamber 63 to another piston chamber (not shown).

Although the prior art piston and seal design is adequate for its intended purpose, it is desirable to provide a piston and seal design that is easier to manufacture and to assemble into a clutch system.

SUMMARY OF THE INVENTION

The present invention provides a clutch assembly for use in an automatic transmission for engaging a first member to a second member utilizing a clutch pack. A piston is disposed within a piston chamber and operable for applying axial pressure to the clutch pack. The piston includes first, second, and third sealing portions integrally molded in place on the piston and engaging the piston chamber at spaced locations. According to one aspect of the present invention, the first, second, and third seal portions are molded from an elastomeric material. According to yet another aspect of the present invention, the inner diameter surface, a side surface, and an outer diameter surface between the first, second, and third seal portions is coated with the elastomeric material which is integral with the first, second, and third seal portions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
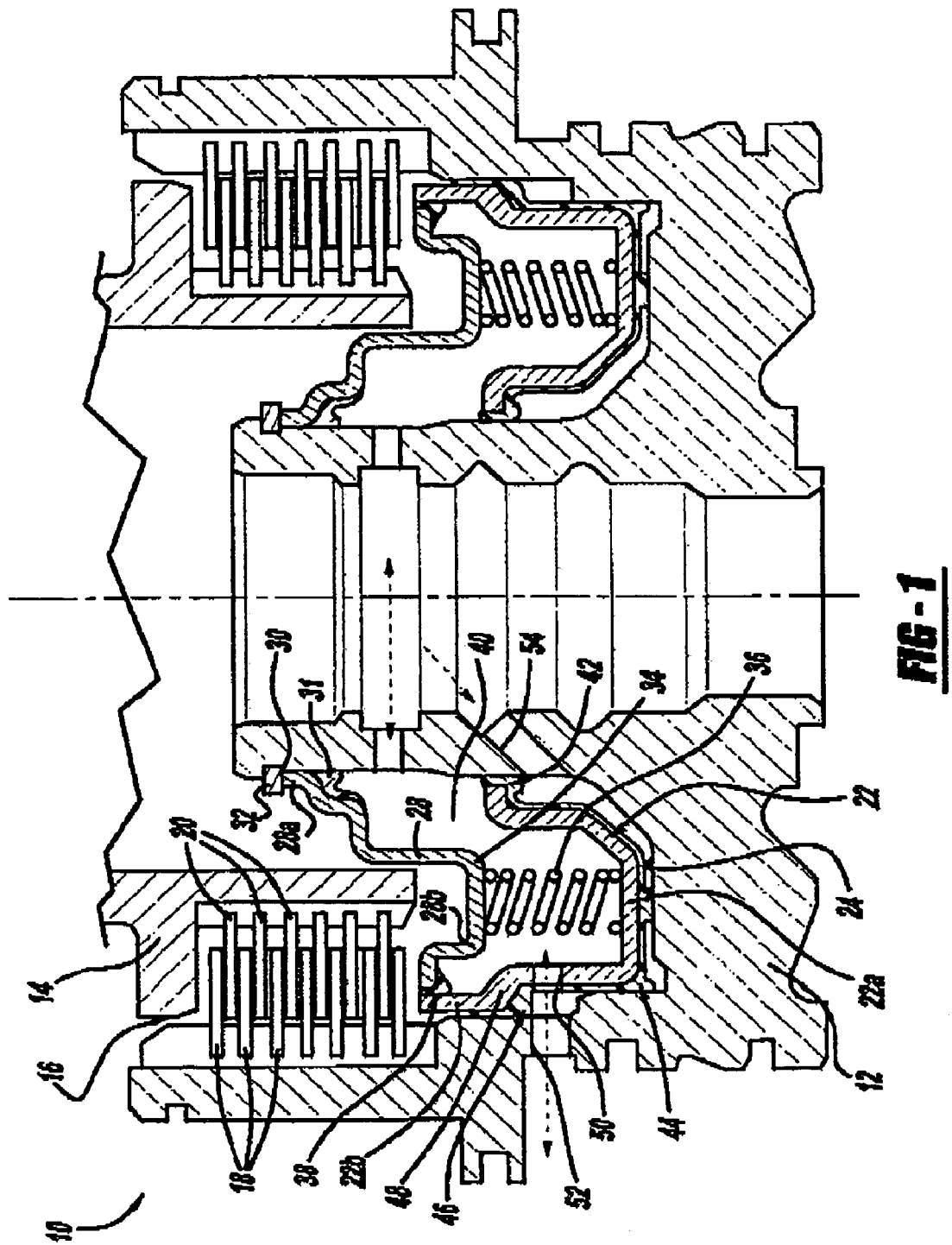
FIG. 1 is a cross-sectional view of a clutch assembly of an automatic transmission incorporating the bonded clutch piston with integral seal portions according to the principles of the present invention.
Figure 2:
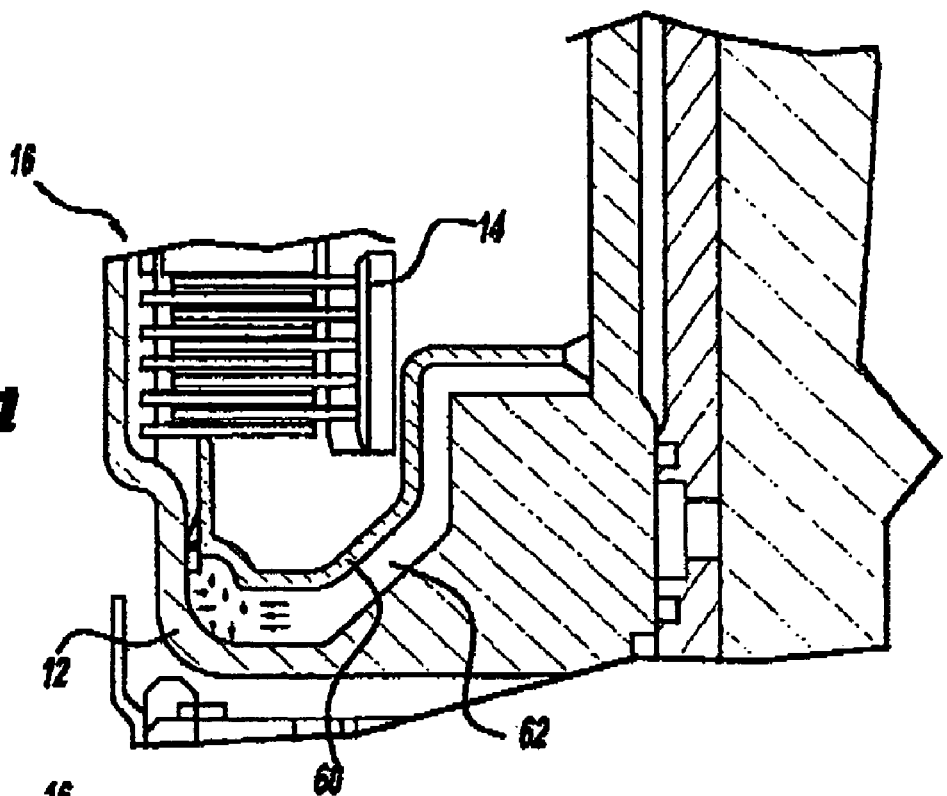
FIG. 2 is a cross-sectional view of a prior art clutch design.
Figure 3:
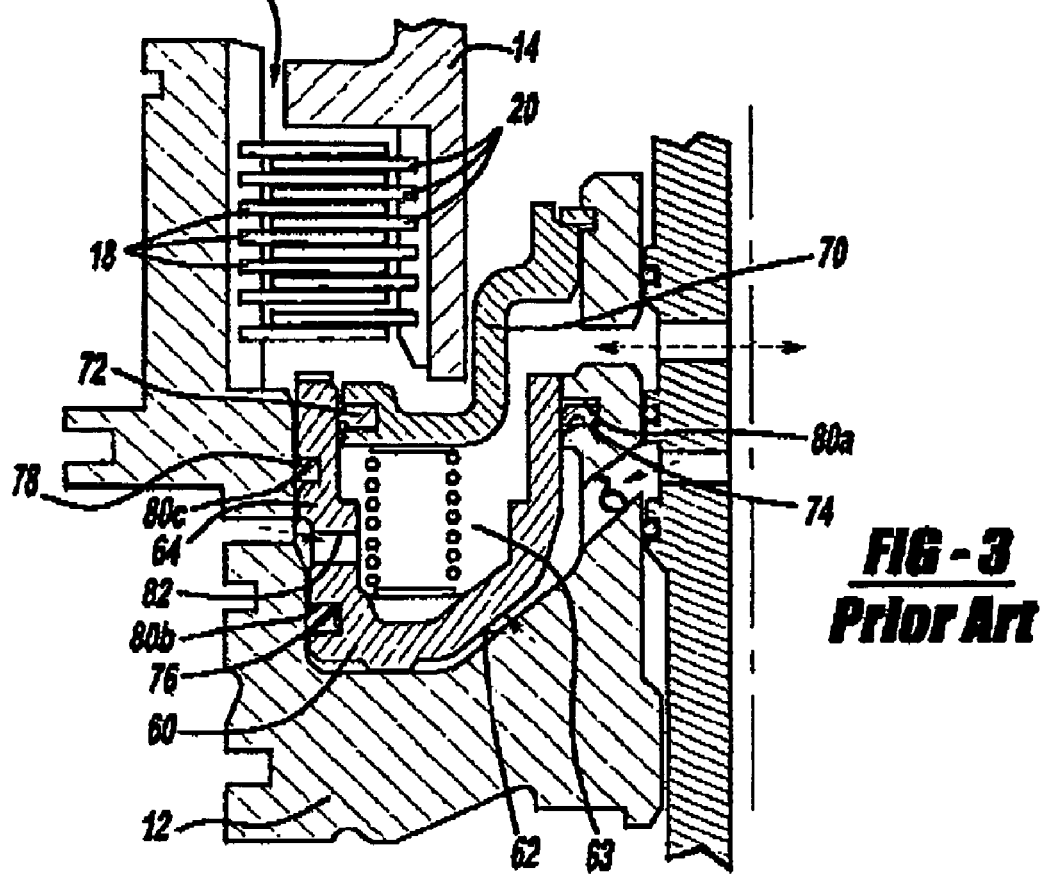
FIG. 3 is a cross-sectional view of a prior art clutch design utilizing a balance piston system.

With reference to FIG. 1, the clutch assembly 10, according to the principles of the present invention, will now be described in which the same reference numerals are utilized to identify the same or similar elements as utilized in describing the prior art systems of FIGS. 2 and 3. The clutch assembly 10 includes a first member 12 and a second member 14 rotatable relative to the first member 12. A clutch pack 16 includes a plurality of clutch plates 18 having external splines which engage internal splines of the first member 12 and a plurality of clutch plates 20 having internal splines connected to external splines of rotatable second member 14. An apply piston 22 is provided in a piston chamber 24 provided in the first member 12. The apply piston includes a radially extending hub portion 22a and an axially extending arm portion 22b which presses against the clutch pack 16.

A balance piston 28 is provided between the clutch pack 16 and the apply piston 22. The balance piston 28 includes an inner hub portion 28a with a central aperture 30 which is received on the shaft portion of member 12. A seal 31 is disposed adjacent to the central aperture 30. The balance piston 28 is disposed against a stop ring 32 and includes a spring seat portion 34 against which a return spring assembly 36 is disposed. Return spring assembly 36 also presses against the radially extending hub portion 22a of the apply piston 22 in order to bias the apply piston 22 to a disengaged position. Hydraulic pressure generated in the piston chamber 24 causes the apply piston 22 to move against the biasing force of the spring assembly 36 and into engagement with clutch pack 16 for causing frictional engagement between first member 12 and rotatable member 14. The balance piston 28 includes a radially extending outer portion 28b which is provided with a seal lip profile 38 which engages the inner surface of the axially extending arm portion 22b of the apply piston 22. A seal 31 is disposed around an inner diameter portion of the balance piston 28. The seal 38, along with balance piston 28 and apply piston 22 define a balance chamber 40 that contains a fluid that offsets the axial pressure generated by the centrifugal force on the fluid in the piston chamber 24.

The piston 22 includes an inner diameter seal portion 42 integrally molded to the piston 22 along with first and second outer diameter seal portions 44 and 46. The first outer diameter seal portion 44 is provided at the interface between the radially extending hub portion 22a and the axially extending arm portion 22b. The second outer diameter seal portion 46 is provided adjacent to a radial offset portion 48 provided in the axially extending arm portion 22b.

The piston includes one or more apertures 50 extending through the axially extending arm portion 22b of the piston 22 in a location disposed between the first outer diameter seal 44 and the second outer diameter seal 46. The apertures 50 communicate with a fluid flow path 52 provided in the first member 12 to allow fluid to pass from the balance chamber 40 to another piston chamber (not shown). The apertures 50 are preferably formed by a laser machining process although drilling or punching processes can also be used. The inner diameter seal portion 42 and first outer diameter seal portion 44 seal off the apply chamber 24 for activating the piston 22 which receives pressurized fluid through fluid supply passage 54. Each of the seals 42, 44, 46 are molded from an elastomeric material. The elastomeric material extends between the seal portions 42 and 44, as well as between the seal portions 44 and 46 as an integrated molding.

With the apply piston 22 having integrally molded seals 42, 44, and 46, the manufacture of the piston 22 is simplified in that the piston can be formed of a stamped plate and the seal portions can be molded thereto so that no additional assembly is required. Furthermore, the seals 42, 44, and 46 are securely held in place during assembly of the apply piston 22 within the piston chamber 24 so that the seals are maintained in the proper orientation. The piston design of the present invention results in component reduction by reducing the number of components as compared to the prior art system, and also reduces labor since the piston no longer requires the installation of the loose seals. With the design of the present invention, a one-to-one balance dam to piston pressure diameter ratio is provided in order to create equal fluid head distribution within the balance dam chamber and the apply chamber.

The description of the invention is merely exemplary in nature and, thus, variations that do not depart from the gist of the invention are intended to be within the scope of the invention. Such Variations are not to be regarded as a departure from the spirit and scope of the invention.

What is claimed is:

1. A clutch assembly, comprising:
   a first member;
   a second member rotatable relative to said first member;
   a clutch pack including at least one first clutch disc attached to said first member and at least one clutch disc attached to said second member;
   a piston chamber adjacent to said clutch pack;
   a piston disposed in said piston chamber and operable for applying axial pressure to said clutch pack, said piston including first, second and third seal portions integrally molded in place on said piston and engaging said piston chamber at spaced locations;
   wherein said piston chamber and said piston are annular in shape and said piston includes an inner diameter surface having said first seal portion disposed thereon and an outer diameter surface having said second and third seal portions disposed thereon.

2. The clutch assembly according to claim 1, wherein said first, second and third seal portions are molded from an elastomeric material.

3. The clutch assembly according to claim 1, wherein said outer diameter surface of said piston includes a radial offset portion, said third seal portion being disposed adjacent to said radial offset portion.

4. The clutch assembly according to claim 1, wherein said piston includes at least one aperture disposed in said outer diameter surface between said second and third seal portions.

5. The clutch assembly according to claim 1, further comprising a balance piston disposed between said apply piston and said clutch pack.

6. The clutch assembly according to claim 1, wherein said inner diameter surface, a side surface and an outer diameter surface between said first, second and third seal portions is coated with an elastomeric material integral with said first, second and third seal portions.

* * * * *